United States Patent [19]
Hertfelder

[11] 3,961,608
[45] June 8, 1976

[54] VALVE FOR CONTROLLING THE FLOW OF COMBUSTION GASES IN A COMBUSTION ENGINE

[75] Inventor: Wilhelm Hertfelder, Steinenbronn, Germany

[73] Assignee: Robert Bosch G.m.b.H., Stuttgart, Germany

[22] Filed: June 5, 1973

[21] Appl. No.: 367,203

[30] Foreign Application Priority Data
Nov. 11, 1972 Germany............................ 2255297

[52] U.S. Cl. ...................... 123/119 A; 137/625.64; 137/625.65; 251/30
[51] Int. Cl.$^2$ ........................................ F02M 25/06
[58] Field of Search.................... 123/119 A; 92/97; 251/30, 61.5, 61.4, 61.3; 137/625.64, 625.65

[56] References Cited
UNITED STATES PATENTS

| | | | |
|---|---|---|---|
| 1,236,216 | 8/1917 | Schuler............................... | 251/61.4 |
| 2,294,693 | 9/1942 | Ray...................................... | 251/30 |
| 3,385,309 | 5/1968 | Bains................................... | 137/625.64 |
| 3,388,635 | 6/1968 | Hager.................................. | 92/97 |
| 3,673,993 | 7/1972 | Nakajima et al................. | 123/119 A |
| 3,739,797 | 6/1973 | Caldwell............................ | 123/119 A |
| 3,774,583 | 11/1973 | King.................................. | 123/119 A |
| 3,791,360 | 2/1974 | Rieger............................... | 123/119 A |
| 3,796,229 | 3/1974 | Wright............................... | 251/30 |
| 3,800,764 | 4/1974 | Goto et al........................ | 123/119 A |
| 3,834,363 | 9/1974 | Goto et al........................ | 123/119 A |

FOREIGN PATENTS OR APPLICATIONS
2,012,938 10/1970 Germany ....................... 123/119 A

*Primary Examiner*—Charles J. Myhre
*Assistant Examiner*—Sheldon Richter
*Attorney, Agent, or Firm*—Michael J. Striker

[57] ABSTRACT

A tubular member is adapted to communicate with an intake manifold and combustion gas conduit of a combustion engine. A housing of the valve has an interior space and a slidable valve member normally extends across and blocks the interior of the tubular member, having a portion extending into the interior space of the housing. At least one flexible diaphragm subdivides the interior space into two chambers and is fixed to the portion of the valve member. One of the chambers communicates with the atmosphere. A first and a second conduit connect the other chamber with the manifold and with the atmosphere, respectively. An electromagnetic valve is operative for alternately connecting the other chamber with the first and with the second conduit, respectively.

10 Claims, 4 Drawing Figures

VALVE FOR CONTROLLING THE FLOW OF COMBUSTION GASES IN A COMBUSTION ENGINE

BACKGROUND OF THE INVENTION

The present invention relates generally to a valve, and more particularly to a valve for controlling the flow of combustion gases generated in a combustion engine. Still more particularly the invention relates to a combustion gas recycling valve which, under certain operational conditions of the combustion engine, recycles a portion of the combustion gases back into the intake manifold of the engine so that they will pass through the engine again, whereby the content of deleterious matter in the combustion gases ejected from the engine is reduced.

Valves of the general type here in question have already become known. In fact, there is a continuing search for improvements in the field with which these valves are concerned, namely for improvements in the manner in which the proportion of deleterious substances in the waste or combustion gases of a combustion engine can be reduced. This is a field of endeavor which is receiving particular attention at the present time, being involved directly in the effort to reduce the deleterious influence of the internal combustion engine upon the environment.

One type of valve known for this purpose is pneumatically regulated by the pressure in the intake manifold of the combustion engine. However, this type of valve requires an additional magnetic valve which is constructed as a second unit cooperating with it and controlling the intake manifold pressure itself. A further type of construction known from the prior art utilizes the intake manifold pressure for controlling a magnetic valve. However, in all these prior-art constructions it is necessary to utilize large, heavy and expensive electromagnets, which is evidently disadvantageous from the point of view of providing an emission control which is inexpensive to construct and sell, and which therefore should be more readily acceptable to the ultimate purchaser.

SUMMARY OF THE INVENTION

It is, accordingly, a general object of the present invention to provide a valve of the type under discussion, for controlling the flow of combustion gases in a combustion engine, which avoids the disadvantages of the prior art.

More particularly it is an object of the present invention to provide such a valve which is constructed as a single structurally integrated unit.

Another object of the invention is to provide such a valve which is simple and inexpensive to produce and therefore to sell.

Still a further object of the invention is to provide such a valve which is light in weight and can be readily installed wherever required.

In keeping with the above objects, and of others which will become apparent hereafter, one feature of the invention resides in a valve for controlling the flow of combustion gases in a combustion engine having an intake manifold and an outlet conduit. The valve comprises a tubular member adapted to communicate with the manifold and conduit, and a housing having an interior space. A slidable valve member normally extends across and blocks the interior of the tubular member and has a portion extending into the interior space of the housing. At least one flexible diaphragm subdivides the interior space into two chambers and is fixed to the portion of the valve member. One of the chambers communicates with the atmosphere. A first and a second conduit connect the other chamber with the manifold and with the atmosphere, respectively, and an electromagnetic valve is operative for alternatively connecting the other chamber with the first and second conduit, respectively.

In order to obtain for continuous regulation of the flow of combustion gases from the engine, the housing may accommodate a second diaphragm which extends in parallel with and is connected with the first-mentioned diaphragm. The pressure compartment adjacent the second diaphragm is always connected with the manifold, and the other chamber in which the first-mentioned diaphragm is located acts in the same direction as pressure exerted by the pressure chamber adjacent the second diaphragm, and is controlled in its operation by the magnetic valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
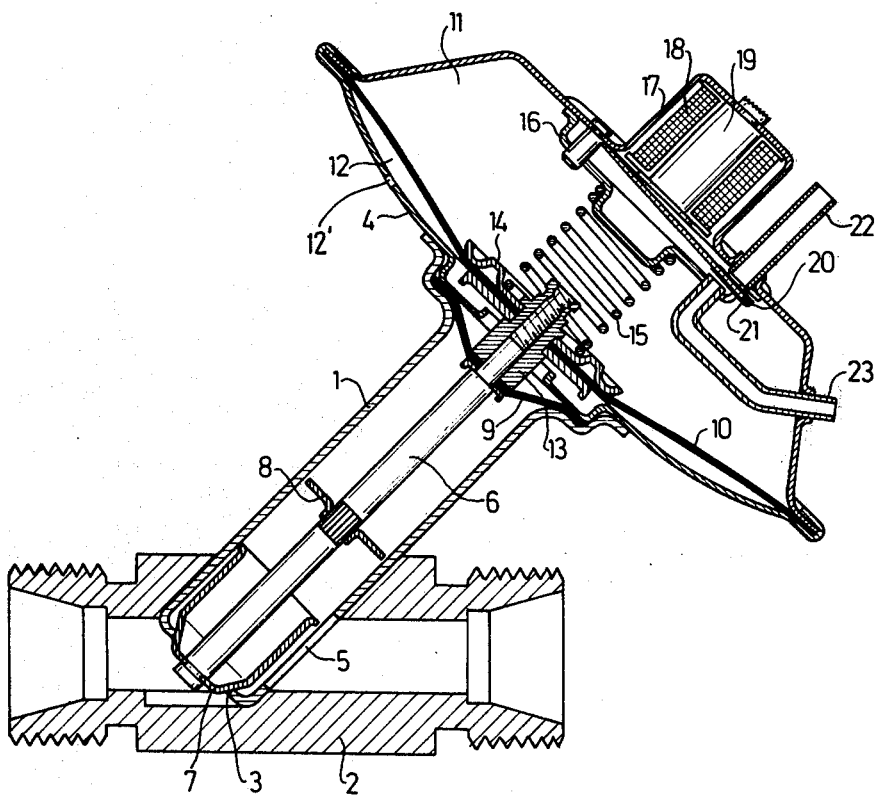
FIG. 1 is a longitudinal section through one embodiment of the invention.

Discussing the drawing in detail, and firstly the embodiment illustrated in FIG. 1 thereof, it will be seen that reference numeral 1 identifies a thin-walled sleeve or tube which can be readily produced as a drawn member and which is soldered into an inclined bore of a tubular member 2 which is to be placed into communication with the intake manifold and combustion gas outlet conduit of a combustion engine (not shown). The tubular member 2 may be produced as a turning if desired. One end of the sleeve 1 is configurated as a valve seat 3 and its other end is made fast with a housing 4. Openings 5 in the wall of the sleeve 1 permit the flow of combustion gases through the tubular member 2.

A valve rod 6 is slidably accommodated in the sleeve 1, carrying a valve member 7 which can close the opening 5. A centering member 8 centers the valve rod 6 in the sleeve 1 and protects a sealing membrane 9 from direct contact with the combustion gases. This sealing membrane 9 is clampingly retained between the sleeve 1 and the housing 4.

The interior space of the housing 4 is subdivided into two chambers by a diaphragm 10 which is sealingly mounted in it. These chambers are identified with reference numeral 11 and reference numeral 12, with the chamber 11 being a regulatable pressure chamber and the chamber 12 being, through an opening 12' in the housing wall, in communication with the ambient atmosphere at the pressure of which it will always be. The center of the diaphragm 10 is connected fixedly with the rod 6 via a connecting element 13, and the center of the membrane 9 is similarly sealingly and fixedly connected with the element 13. A plate 14 is located in the chamber 11, contacting the diaphragm 10 and being fixedly connected with the element 13.

Also located in the chamber 11 is a spring 15 which is compressed between the plate 14 and an abutment 16, so that as a result of the action of the spring 15 the valve will normally be closed (flow through the element to be prevented) when the valve is in rest position. A recess 17 of the housing 4 accommodates a coil 18 of a magnetic valve 19, whose armature 20 is configured as a leaf spring one end of which is fixedly connected with the housing 4 and the other free end of which carries a sealing member 21. The opening of a conduit 22 communicating with the non-illustrated intake manifold of the engine, and the opening of a conduit 23 communicating with the ambient atmosphere, are located in the chamber 11 at opposite sides of the sealing member 21. This means that in the rest position of magnetic valve 19, that is when the latter is not energized, the spring 20 presses the element 19 against the opening of the conduit 23, closing the same off from the chamber 11, whereas when the magnetic valve 19 is energized the spring 20 will be so deflected that its sealing element 21 will be pressed against the opening of the conduit 22.

The valve will normally be in the position in which the element 21 is pressed by the spring against the opening of the conduit 23. When the combustion engine is started up, however, an underpressure or suction will develop in the intake manifold of the engine which will be communicated through the conduit 22, creating sufficient suction or underpressure in the chamber 11 to cause atmosphere pressure in chamber 12 to deflect the diaphragm 10 against the action of the spring 15 towards the upper right FIG. 1, thereby moving the rod 6 in the valve member 7 to a position in which combustion gases can flow from the outlet conduit of the engine through the tubular member 2 which returns them into the intake manifold of the engine. Of course, only a portion of the combustion gases is so recirculated. When the engine idles, or reaches a certain rpm of for instance 3,500 per minute, the recirculation of the combustion gases is either no longer desired or necessary. At this time, an appropriate electronic control device (not shown, but known per se) can activate the magnetic valve 19 which then deflects the spring 20 so that the element 21 closes the opening of the conduit 22. This at the same time opens communication between the chamber 11 and the ambient atmosphere via conduit 23, permitting the spring 15 to deflect the diaphragm 10 towards the lower left in FIG. 1, and thereby closing the passage through the tubular member 2.

Figure 2:
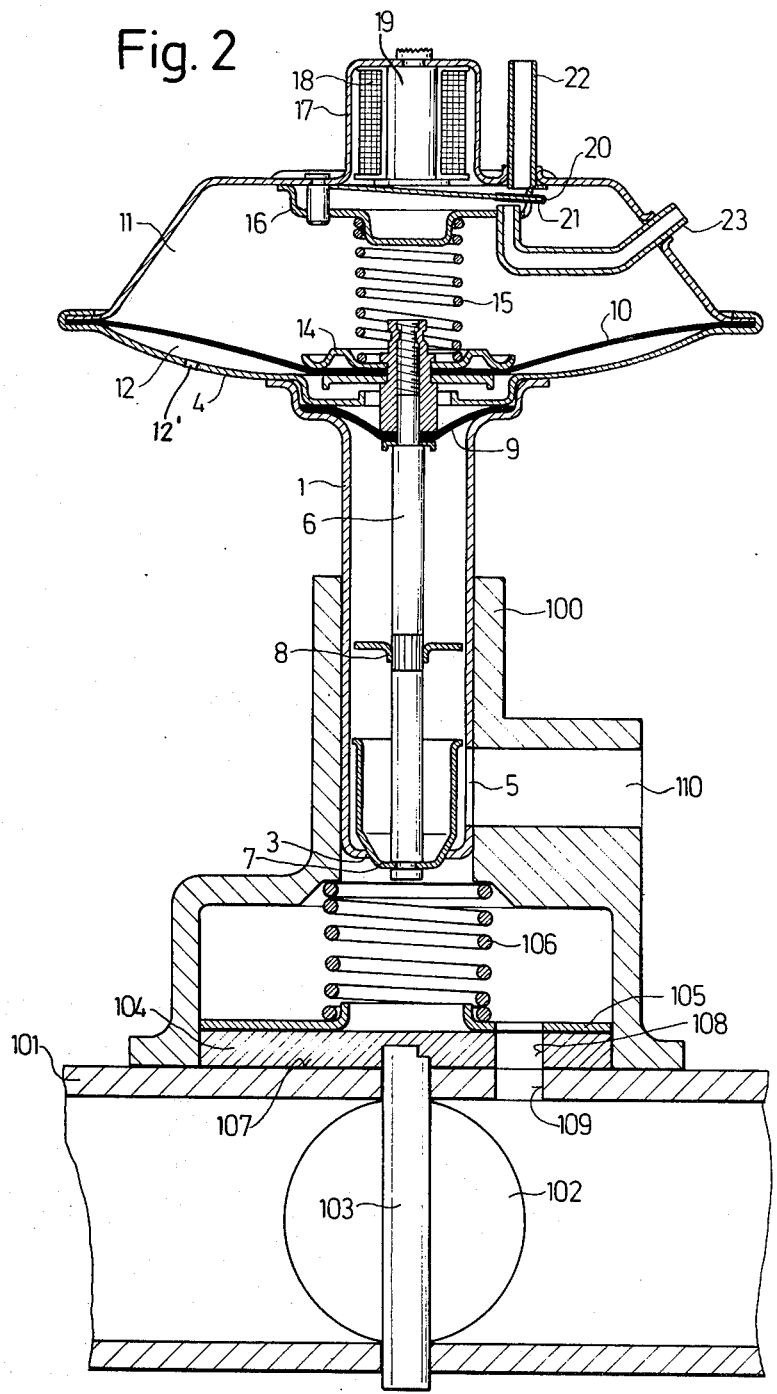
FIG. 2 is a longitudinal section through a further embodiment of the invention, showing in part a portion of the combustion engine intake manifold.

Coming to the embodiment in FIG. 2 it will be seen that like reference numerals designate like components in FIG. 1. Here, the sleeve 1 is soldered into a member 100 which replaces the member 2 of FIG. 1 and also generally is of tubular configuration. The member 100 is fixedly connected with the intake manifold 101 of a combustion engine in the region of a throttle valve 102 mounted in the manifold 101. Of course, instead of solder connections it is possible to use screw connections or other connections wherever such connections must be established.

In any case, the throttle valve 102 is mounted for turning movement about a shaft 103 which extends through a bore in the manifold 101 into the member 100 where it is fixedly connected with the plate 104 that extends normal to the axis of the shaft 103. A pressure spring 106 is provided, pressing a plate 105 against the plate 104, so that the latter sealingly contacts a planar surface 107 of the intake manifold 101. A cutout 108 is provided in the plate 104, which is spaced at the same distance from the axis of the shaft 103 as a similar cutout 109 which is provided in the manifold 101. An inlet opening 110 is provided in one side of the member 100 for admitting combustion gases into the latter.

In operation, and assuming that the valve is open, the combustion gases enter through the opening 110, pass the valve seat 3 and when the cutouts 108 and 109 overlap one another to any extent, the gases will pass through them into the intake manifold 101. The arrangements of the cutouts 108 and 109 is such that when the throttle 102 is closed, overlapping is just prevented. As the throttle 102 increasingly moves towards open position, the extent of overlap increases also between the cutouts 108 and 109, so that with increasing opening of the throttle 102 the overlap increases and a greater flow of combustion gases back into the manifold 101 is possible. When the throttle valve 102 reaches an angular position corresponding for instance to a combustion engine rpm of approximately 3,500 rpm, an electronic control can activate the magnetic valve 19 which causes the valve member 7 to engage the valve seat 3 and close the valve against further return of combustion gases into the intake manifold 101.

Figure 3:
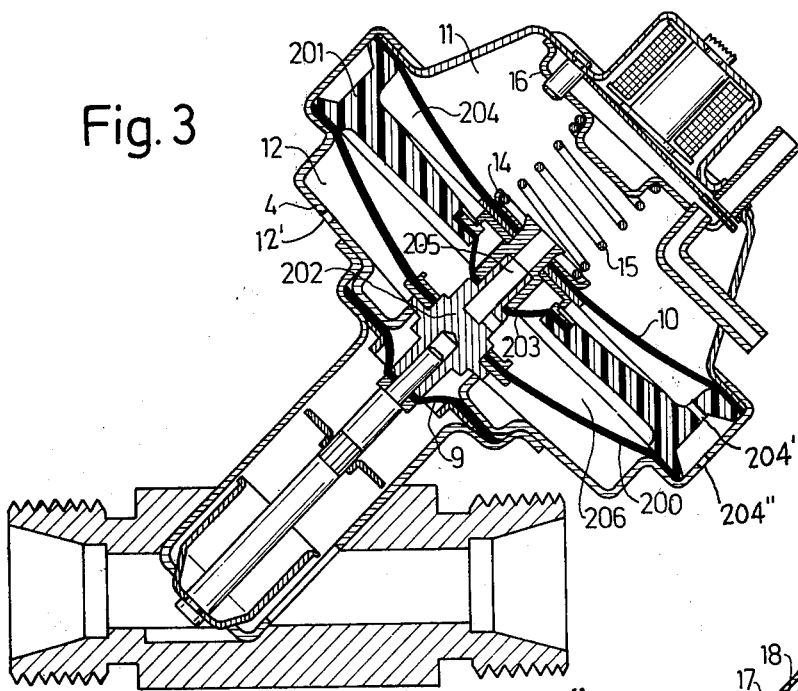
FIG. 3 is a view similar to FIG. 1, but illustrating a further embodiment of the invention.

In FIG. 3 there is illustrated an embodiment in which the housing 4 accommodates not only the diaphragm 10, but a second diaphragm 200. Both of these diaphragms are clampingly connected with the housing 4 by means of a separator 201. A spacer 202 connected the valve rod 6 fixedly with the two membranes 10 and 200 and keeps the latter parallel to one another. It will be seen that the center portions of the diaphragms 10 and 200, the membrane 9 and an intermediate membrane 203 are each sealingly connected with the spacer 202, the membrane 203 having the purpose of sealingly closing a bore in the separator 201. It will be seen that in addition to the chamber 12 there is provided a second chamber 204 which is also in communication with the ambient atmosphere through an opening 204' in the separator and a further opening 204'' in the housing wall. A channel 205 is provided in the spacer 202 and connects the chamber 11 with a chamber 206 the interior pressure of which can be regulated in the same manner as and simultaneously to the chamber 11. In all other respects the embodiment of FIG. 2 corresponds to that of FIG. 1.

Essentially, the operation of the embodiment of FIG. 3 is also the same as that in FIG. 1. However, the provision of the second chamber 206 assures that a double shifting force is exerted upon the valve rod 6, given the same amount of suction or underpressure, because the effective diaphragm surface is doubled. When an increased shifting force is not necessary, then the outer diameter of the housing 4 can be reduced by the factor 2, in order to obtain the same force as if a larger housing having a larger single membrane (as in FIG. 1) were utilized.

Figure 4:
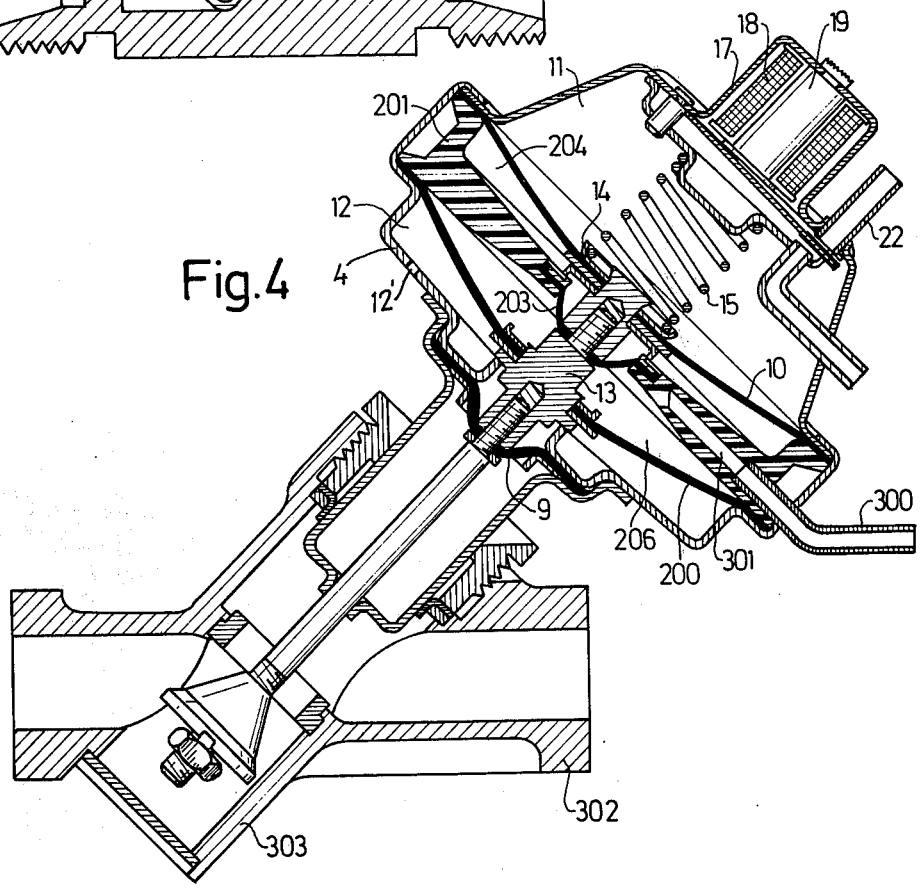
FIG. 4 is a view analogous to FIG. 1 but illustrating still an addtional embodiment of the invention.

There is, finally, the embodiment of FIG. 4 which differs from that of FIG. 1 in that the spacer 202 is not provided with the channel 205 connecting the chambers 11 and 206 with one another. Instead, the embodiment of FIG. 4 provides for a second conduit 300 which communicates with the intake manifold and which further communicates with the housing 4 intermediate the diaphragms 10 and 200.

In bore 301 is provided in the separator 201, establishing a communication between the conduit 300 and the chamber 206. The valve member 7 on the valve rod 6 is provided on that side of the valve seat 3 which is opposite the housing 4, so that in the rest position of the valve the latter is opened. The member 302 corresponds to the member 2 of FIG. 1, but has the different configuration shown in FIG. 4 and is provided with the portion 303 in which the valve member 7 moves. The other portions of the arrangement correspond to those of FIG. 3.

In the embodiment of FIG. 4 the conduit 300 is constantly in communication with the intake manifold, and therefore at the pressure thereof. The conduit 22 is also connected with the manifold when the valve 19 is not energized. The spring 15 is so dimensioned that in the non-energized condition of the valve 19 the valve member 7 engages the valve seat, closing the valve. This condition is to prevail when the engine idles, and when the engine operates above a predetermined rpm, for instance above 3,500 rpm. If the idling speed is exceeded, an electronic control (known per se) energizes the magnetic valve 19 and as a result the chamber 11 becomes connected with the ambient atmosphere and is at the pressure thereof. The suction of the intake manifold now continuously controls the conditions in the interior of the chamber 206 via the second conduit 300. As the engine rpm increases, the suction in the intake manifold similarly increases, and consequently the suction in the chamber 206 will increase with the result that the valve becomes open to progressively greater extent until the maximum rpm (e.g., 3,500) the valve is closed by activation of the magnetic valve 19.

The construction according to the present invention has the particular advantage that all components are accommodated in a single relatively small and lightweight structural unit, which in addition is very inexpensive to produce. The recirculation of waste gas into the intake manifold can be regulated continuously, so that an increase in the rpm of the engine will automatically result in the recirculation of an increased amount of combustion gas into the intake manifold. On the other hand, when the combustion engine is idling, or when it operates at a speed above a certain preselected speed, for instance above 3,500 rpm, no combustion gas is to be recirculated in which case the valve is closed by the electromagnetic vavle 19.

It will be understood that each of the elements described above, or two or more together, may also find a useful application in other types of constructions differing from the types described above.

While the invention has been illustrated and described as embodied in a valve for controlling the flow of combustion gases in a combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A valve for controlling flow of combustion gases of an internal combustion engine, said valve comprising a tubular member communicating at opposite ends with an intake manifold and a gas outlet of the engine respectively; a housing having an interior space; valve means having a slidable valve member movable across said tubular member between said opposite ends thereof between an open position permitting flow of combustion gases from the gas outlet into the manifold and a closed position preventing such flow, said valve means including a valve rod extending with one end into said interior space; at least one flexible diaphragm subdividing said interior space into two chambers and being fixed to said one end of said valve rod, one of said chambers communicating with the atmosphere; a first conduit communicating at one end with the other chamber and at the other end with the manifold; a second conduit communicating at one end, spaced from and substantially aligned with said one end of said first conduit, with said other chamber, and at the other end with the atmosphere; and an electromagnetic valve for alternatively closing said one end of one of said conduits while opening said one end of the other of said conduits and vice versa, said electromagnetic valve being arranged in said other chamber, coaxially with said valve rod and having an armature in form of a leaf spring fixed at one end to said housing and having a free end portion located between said one end of said first conduit at said one end of said second conduit, and sealing material provided on said free end portion for sealingly engaging the one end of the respective conduit.

2. A valve as defined in claim 1; and further comprising an additional diaphragm in said housing, extending parallel to and connected for movement in unison with the first-mentioned diaphragm.

3. A valve as defined in claim 2; further comprising a spacer connecting said diaphragms and provided with a channel connecting said other chamber with a pressure compartment adjacent said additional diaphragm.

4. A valve as defined in claim 2, said additional diaphragm defining in said housing a pressure compartment which is in permanent communication with said manifold.

5. A valve as defined in claim 1, said tubular member being fixedly connected with the suction manifold in the region of an airflow-controlling adjustable throttle therein; and further comprising an auxiliary valve interposed in said tubular member and controlled in dependence upon the movements of said throttle.

6. A valve as defined in claim 5, wherein said throttle is turnable about a shaft; and wherein said auxiliary valve comprises a plate mounted on and turnable with said shaft, said tubular member and said plate having respective cutouts which are adapted to register when said plate turns to a requisite position and whose flow-through cross-section increases as said throttle opens.

7. A valve for controlling the flow of combustion gases of an internal combustion engine, said valve comprising a tubular member communicating at opposite ends with an intake manifold and a combustion gas outlet of the engine, respectively; a housing having an interior space; valve means having a slidable valve member normally extending across and blocking said interior of said tubular member, and a valve rod extending into said interior space; at least one flexible diaphragm subdividing the interior space into two chambers and being fixed to said valve rod, one of said chambers communicating with the atmosphere; a sleeve surrounding said valve rod and being connected to said housing; a sealing membrane extending across said sleeve and having a marginal portion clamped between said sleeve and said housing and a center portion penetrated by and sealingly fixed to said valve rod; a first and a second conduit connecting the other of said chambers with the manifold and with the atmosphere, respectively; and an electromagnetic valve operative for alternatingly connecting said other chamber with said first and second conduits, respectively.

8. A valve as defined in claim 7, said electromagnetic valve having an armature configurated as a leafspring provided with a free end portion, and a sealing material provided on said free end portion, said conduits having respective openings located adjacent opposite major surfaces of said leafspring so as to be alternately blocked by said sealing material thereon.

9. A valve as defined in claim 7 wherein said valve rod and said sleeve have poor heat conducting characteristics.

10. A valve as defined in claim 9, wherein said valve rod and sleeve are of chrome-nickel steel.

* * * * *